(12) United States Patent
Firic (10) Patent No.: US 8,894,373 B2
(45) Date of Patent: Nov. 25, 2014

(54) VERTICAL SPIRAL ANGLE WIND TURBINE

(76) Inventor: Paul Firic, Welland (CA)

( * ) Notice: Subject to any disclaimer, the term of this patent is extended or adjusted under 35 U.S.C. 154(b) by 568 days.

(21) Appl. No.: 13/234,228

(22) Filed: Sep. 16, 2011

(65) Prior Publication Data

US 2012/0082560 A1  Apr. 5, 2012

Related U.S. Application Data (60) Provisional application No. 61/388,088, filed on Sep. 30, 2010.

(51) Int. Cl.
*F03D 3/06* (2006.01)

(52) U.S. Cl.
CPC ............... *F03D 3/061* (2013.01); *F03D 3/065* (2013.01); *F05B 2250/25* (2013.01); *Y02E 10/74* (2013.01)
USPC ...................................................... 416/223 R

(58) Field of Classification Search
USPC ............. 416/242, 243, 176, 223 R, 224, 117, 416/119, 120, 210 R, 204 R, 211; 415/4.2, 415/4.4, 907, 905; 290/55, 44
See application file for complete search history.

(56) References Cited

U.S. PATENT DOCUMENTS

| | | | | |
|---|---|---|---|---|
| 4,115,027 A | * | 9/1978 | Thomas | 415/53.1 |
| 7,494,315 B2 | * | 2/2009 | Hart | 415/4.2 |

\* cited by examiner

*Primary Examiner* — Edward Look
*Assistant Examiner* — Maxine Adjagbe (57) ABSTRACT

The present device is a vertically oriented wind turbine blade having a rectangular curvilinear shaped blade which includes a top edge, a bottom edge, an outer edge, a helical inner edge, an inner surface and an outer surface. The blade's top edge is curved and defines a radius R and the helical inner edge defines an angle theta relative to a vertical reference line. The blade further includes an L shaped outer rib with a transverse leg mounted to the inner surface and extending along the outer edge, the outer rib also includes a perpendicular leg extending perpendicular to the transverse leg.

10 Claims, 8 Drawing Sheets

VERTICAL SPIRAL ANGLE WIND TURBINE

This application claims priority from previously filed U.S. provisional application Ser. No. 61/388,088 on Sep. 30, 2010, by Paul Firic under the title VERTICAL SPIRAL ANGLE WIND TURBINE.

FIELD OF THE INVENTION

The present invention relates to wind turbines in particular relates to wind turbine blade technology.

SUMMARY OF THE INVENTION

Historically numerous wind turbines have been designed and deployed using various designs. The major drawback with all of these designs is the complexity used in order to create the wind turbine and the cost involved with manufacturing and deployment of the wind turbines in the field.

Currently many wind turbines require complex mechanical devices in order to ensure that the turbine is oriented in the correct direction. One of the advantages of the current design is that regardless of the direction of the wind the wind turbine will effectively produce power.

BRIEF DESCRIPTION OF THE DRAWINGS

The present device will now be described by way of example only with reference to the following drawings in which.

DESCRIPTION OF THE PREFERRED EMBODIMENTS

Figures 1, 2:
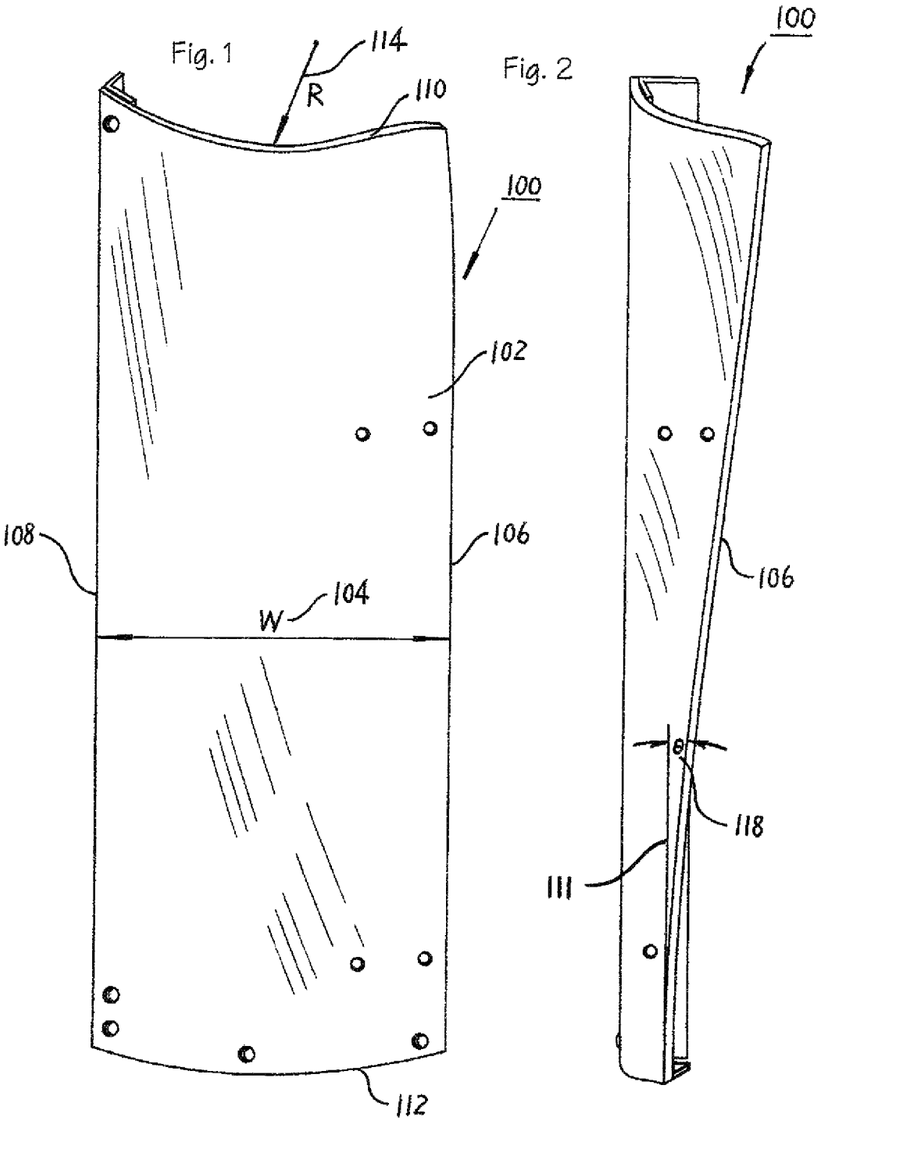
FIG. 1 is a schematic outer perspective view of a wind turbine blade.
FIG. 2 is a schematic end perspective view of the blade shown in FIG. 1.
Figures 3, 4:
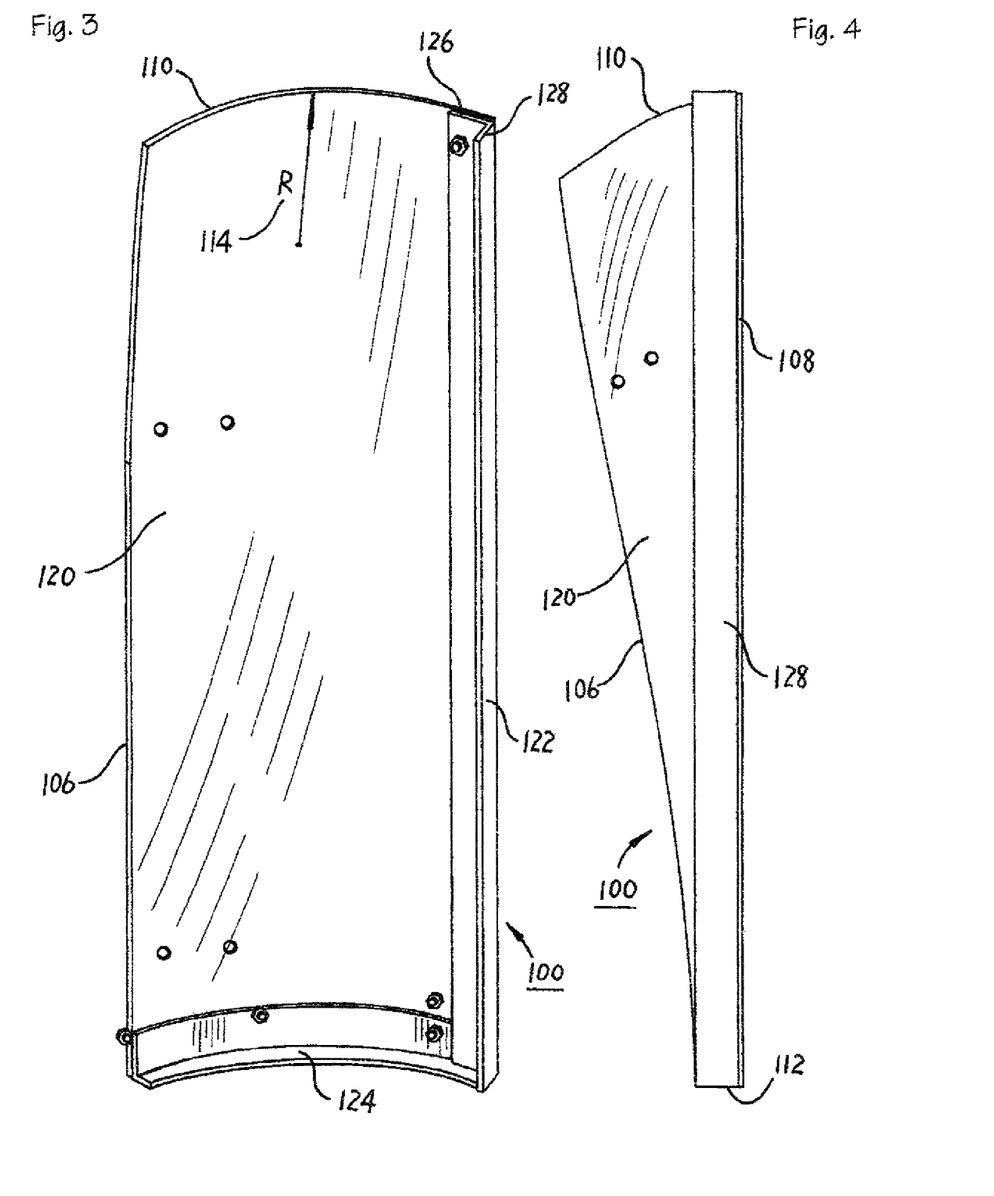
FIG. 3 is a schematic inner perspective view of the blade shown in FIG. 1.
FIG. 4 is an inner end schematic perspective view of the blade shown in FIG. 1.

The present device a vertically oriented blade shown generally as 100 which can be utilized in wind turbines normally constructed of thin planar metal such as steel or aluminum or composite materials such as fiber glass, carbon fiber, or plastic and the like and includes the following major components namely a generally square or rectangular curvilinear shaped blade including an outer surface 102 shown in FIG. 1 an inner surface 120 shown in FIG. 3, a helical inner edge 106, an outer edge 108, a top edge 110 having a radius r shown as 114 and a bottom edge 112.

The helical inner edge 106 describes a spiral angle theta shown as 118 which is the angle between the helical inner edge 106 and a hypothetical vertical reference line 111 as shown in FIG. 2. The blade is oriented vertically wherein outer and inner edges 108 and 106 run approximately in the same direction as the vertical reference line 111.

The inner surface 120 of blade 100 as depicted in FIG. 1 is shown in FIG. 3. Blade 100 includes an L shaped outer rib 122, which is positioned along the outer edge 108 of blade 100.

Outer rib 122 includes a transverse leg portion shown as 126 and a perpendicular leg portion shown as 128. Blade 100 further includes a blade flange 124, which runs along bottom edge 112.

Figure 5:
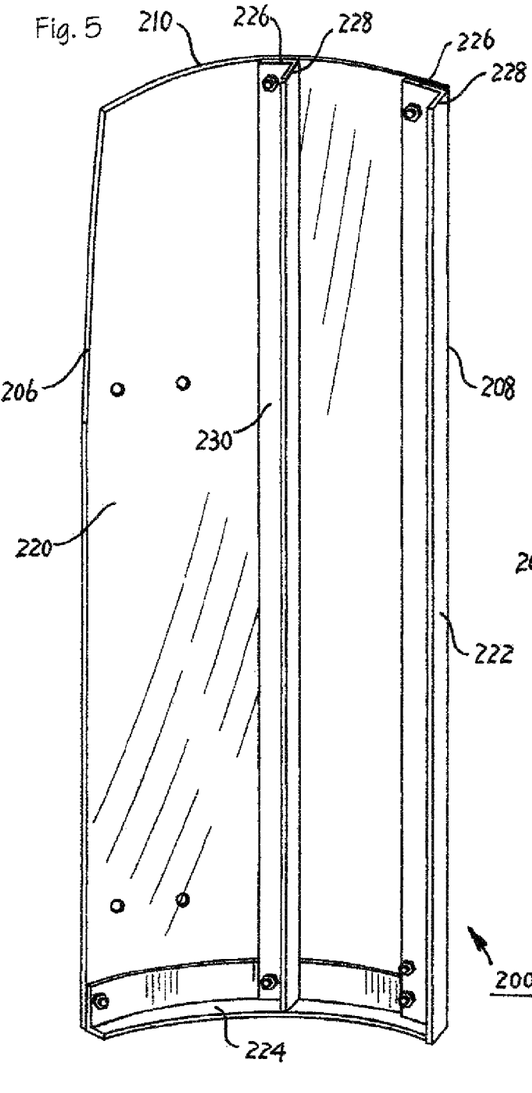
FIG. 5 is an alternate inner perspective view of the blade shown in FIG. 1.
Figure 6:
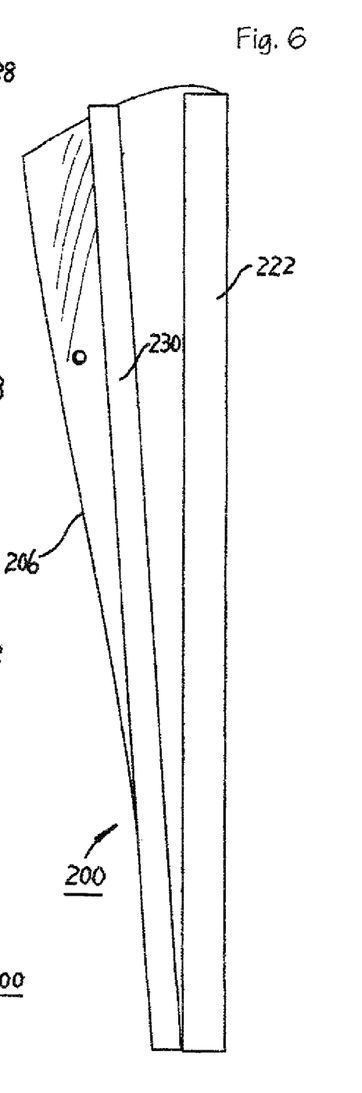
FIG. 6 is an alternate end inner perspective view of the blade shown in FIG. 1.

FIGS. 5 & 6 show an alternate blade shown generally as 200 which has the same outer appearance as shown in FIGS. 1 & 2 namely has the same outer surface 102 as depicted in FIGS. 1 & 2.

Blade 200 includes an inner surface 220 having an outer rib 222 and a central rib 230. Each of outer ribs 222 and central rib 230 include a transverse leg 226 and a perpendicular leg 228. Blade 200 also includes a helical inner edge 206, which is similar to the helical inner edge 106 as depicted in FIGS. 1 & 2.

Central rib 230 is positioned approximately midway between the inner edge 208 and the helical inner edge 206 of blade 200.

Blade 200 may be used in instances where the width shown generally as "W" 104 in FIG. 1 becomes so large that additional reinforcing is required in order for blade 200 to keep it's shape in high wind conditions.

Figure 7:
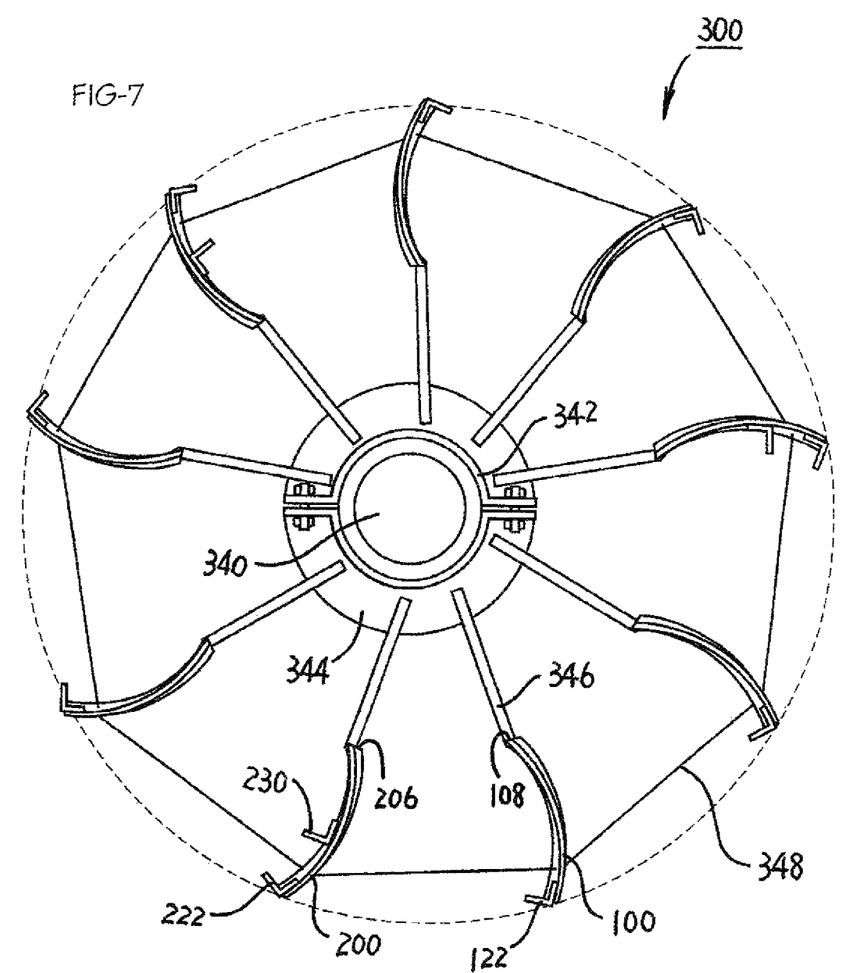
FIG. 7 is a top plan view of a wind rotor, using blade shown in FIG. 1.

FIG. 7 shows schematically a top plan view of a wind rotor 300 showing blades 100 and also blades 200 deployed thereon.

Wind rotor 300 includes a rotor shaft 340, a collar 342 and shaft flange 344 to which is attached struts 346 which rigidly connect blades 100 and/or blades 200 to rotor shaft 340.

In addition to maintain the distances between adjacent blades stays 348 are used.

Figure 10:
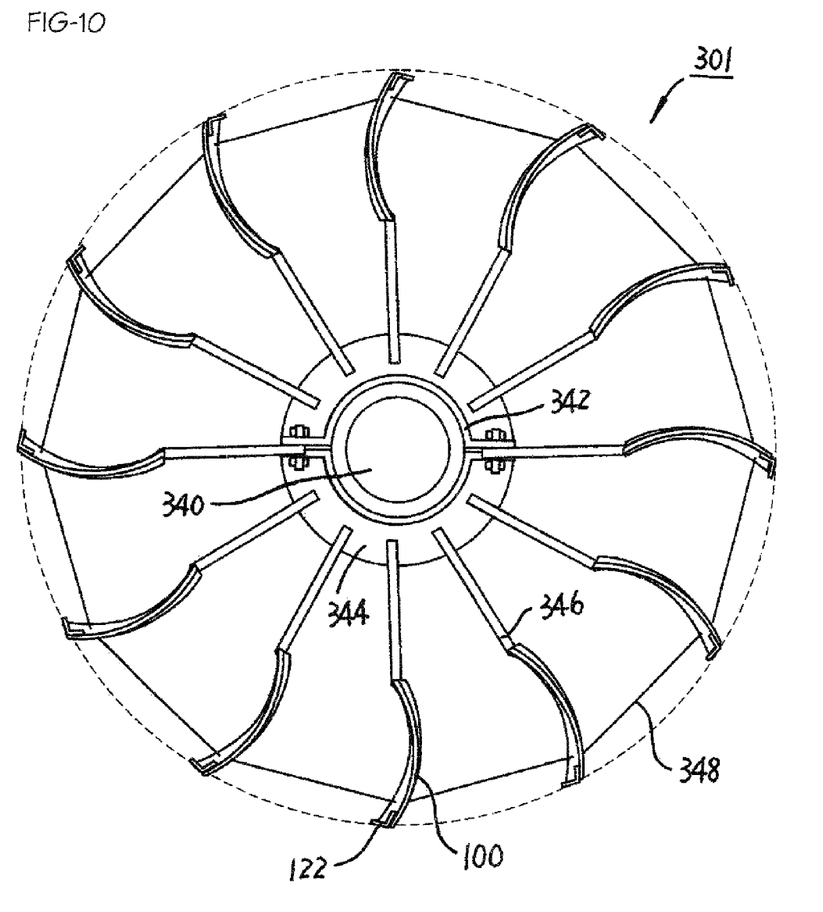
FIG. 10 is a top plan view of a wind rotor showing blades used in FIG. 1.

Any number of blades 100 can be used in a wind rotor 300 and another example is shown in FIG. 10 depicting wind rotor 301. In FIG. 7 for example a wind rotor having a total of 9 blades is depicted whereas in FIG. 10 a wind rotor having a total of 12 blades 100 is depicted.

Any number of blades can be selected depending upon the diameter, size and power required for the wind turbine to produce.

Figure 8:
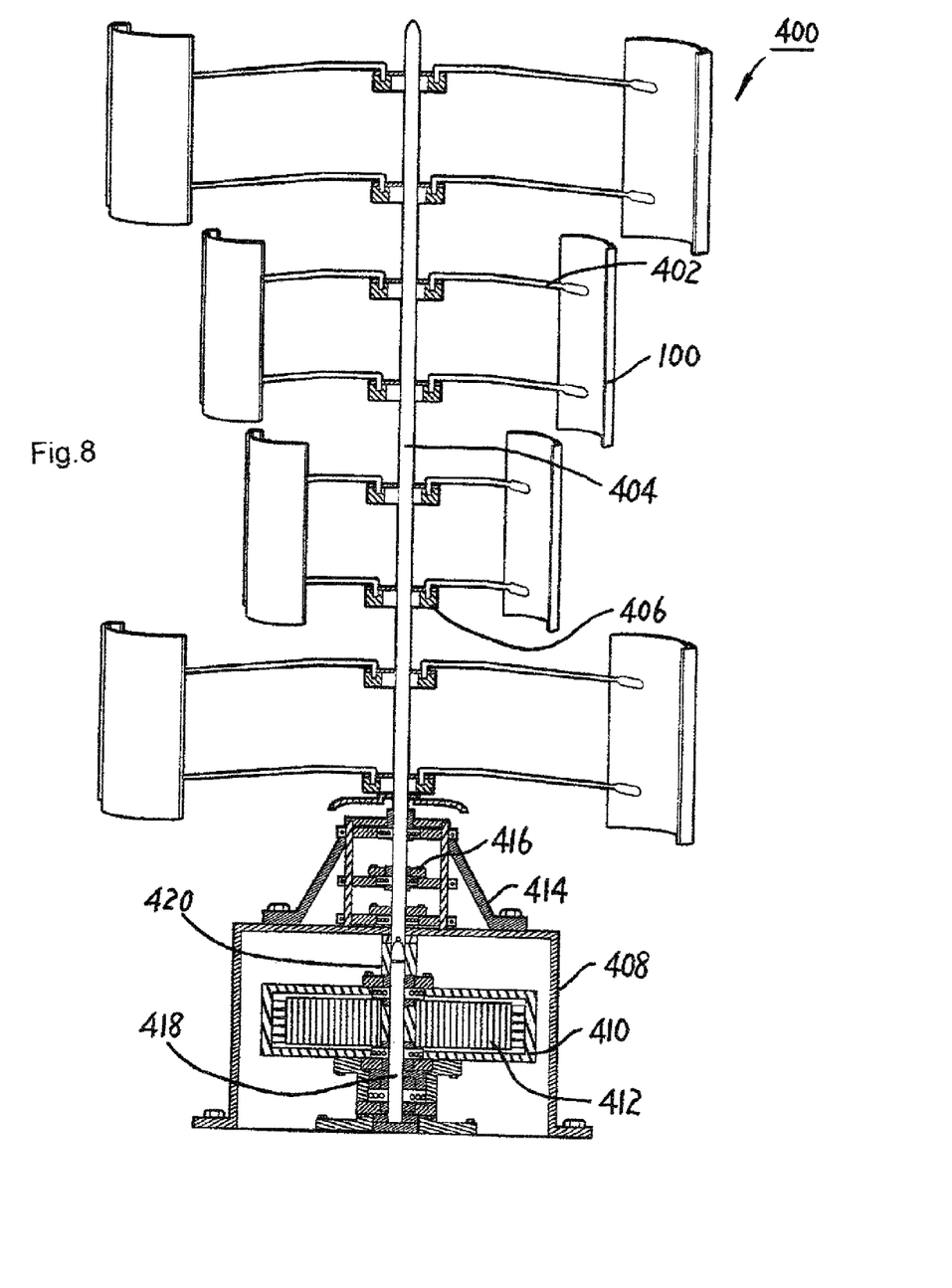
FIG. 8 is a schematic partial cut away perspective view of a wind turbine utilizing the blades depicted in FIG. 1.

Referring now to FIG. 8, which is an example of a wind turbine 400, which shows deployed blades 100 connected to a rotor shaft 400 using struts 402 and collars 406.

Rotor shaft 404 is coupled to a generator shaft 418 with coupling 420. Generator 410, which includes a generator rotor 412, is housed within housing 408. Rotor shaft 404 is connected to flange 414 with bearings 416. Preferably a large diameter generator 410 is selected in order to ensure that maximum power is generated at low rpms. Large diameter generator is defined as having a rotor diameter of at least 50 cm.

Figure 9:
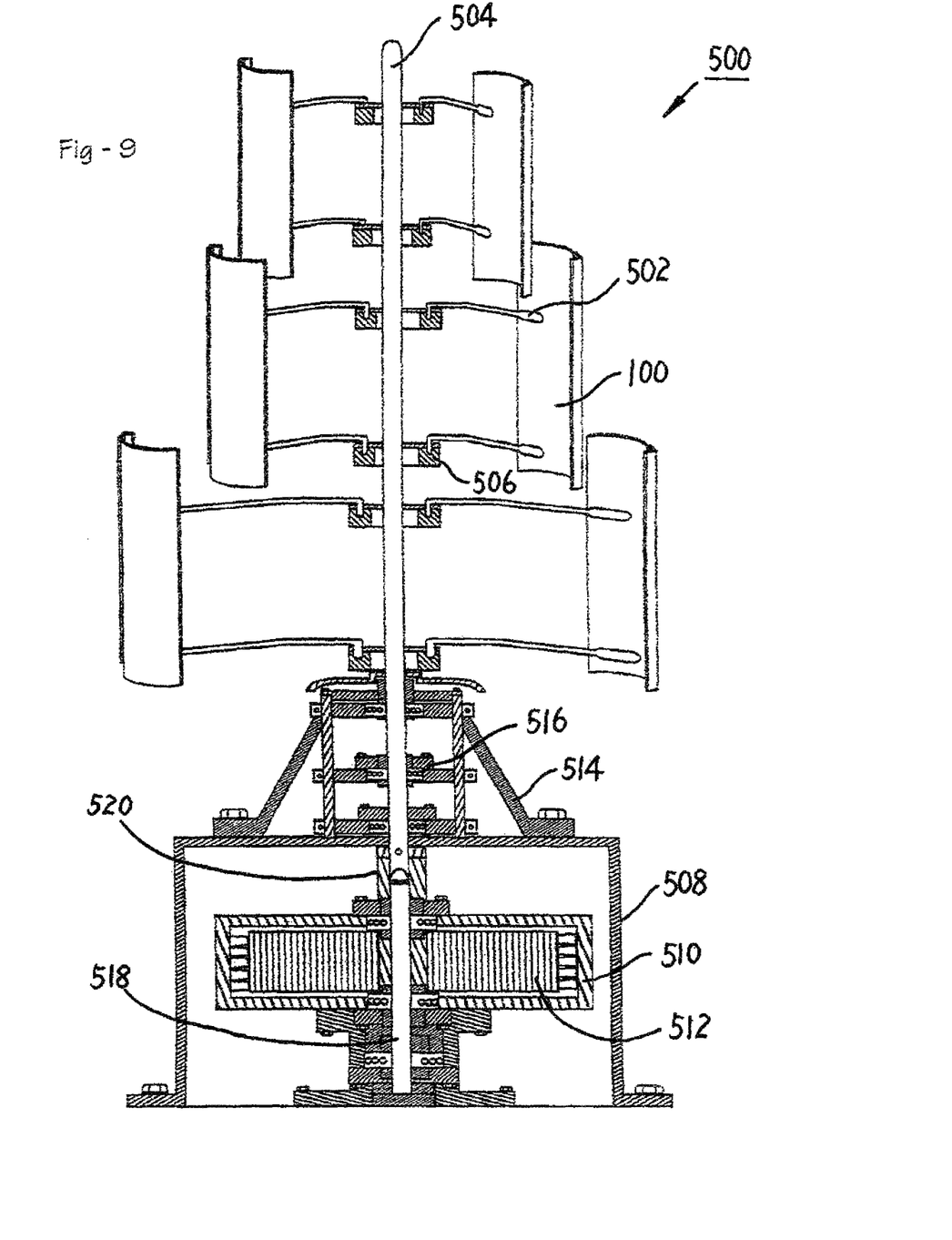
FIG. 9 is an alternate partial cut away perspective view of an alternate wind turbine using blades shown in FIG. 1.

FIG. 9 is an alternate example of a wind turbine 500 showing blades 100 rigidly connected to rotor shaft 504 with struts 502 and collars 506. Similar to wind turbine 400 rotor shaft 504 is connected to generator shaft 518 using couplings 520. Housing 508 houses a generator 510 having a generator rotor 512. Rotor shaft 504 is attached to flange 514 using bearings 516.

Figure 11:
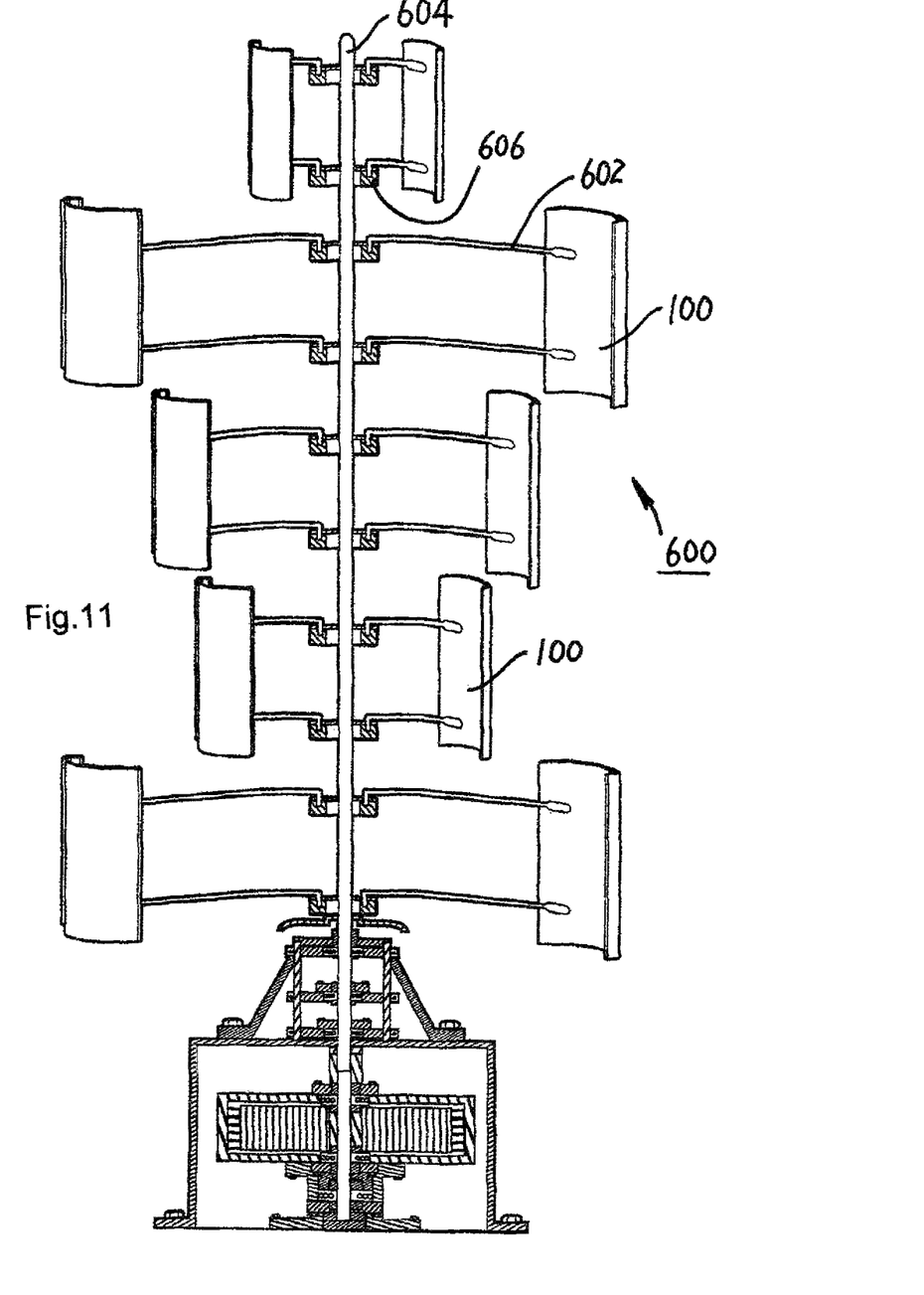
FIG. 11 is an alternate partial cut away perspective view of a wind turbine using blades shown in FIG. 1.

FIG. 11 shows yet another alternate embodiment namely a wind turbine 600 using blades 100 deployed thereon. Blades 100 are attached to rotor shaft 604 using strut 602 and collars 606.

Blade 100 includes a number of unique features as follows.

Firstly there is a helical inner edge 106, which defines a helix which if projected upwardly would complete a complete circle in about 5 meters in vertical distance. In other words by conceptually extrapolating the helical inner edge 106 upwardly one would create a helix which completes one full rotation over a vertical distance of approximately 3.5 to 6 meters and preferably over a vertical distance of 4 to 5 meters and most preferably over a distance of 5 meters.

Blade 100 also includes a radius shown as r 114 in FIG. 1 and also in FIG. 3 in which the inner surface is a concave surface having an inner radius r 114, which ranges in between 10 centimeters and 40 centimeters and preferably is in the range 15 to 25 centimeters and most preferably is 20 centimeters.

I claim:

1. A vertically oriented wind turbine blade comprising:
   a) a rectangular curvilinear shaped blade which includes a top edge, a bottom edge, an outer edge, a helical inner edge, an inner surface and an outer surface;
   b) wherein the top edge is curved and defines a radius R;
   c) wherein the helical inner edge defines an angle theta relative to a vertical reference line,
   d) wherein the blade further includes an L shaped outer rib with a transverse leg mounted to the inner surface and extending along the outer edge, the outer rib also includes a perpendicular leg extending perpendicular to the transverse leg.

2. The wind turbine blade claimed in claim 1 wherein the blade further includes an L shaped central rib with a transverse leg mounted to the inner surface and extending vertically along substantially the center of the blade, the central rib also includes a perpendicular leg extending perpendicular to the transverse leg and vertically along substantially the center of the blade.

3. The wind turbine blade claimed in claim 2 wherein the blade further includes an L shaped blade flange with one leg of the L mounted to the inner surface and extending along the bottom edge.

4. The wind turbine blade claimed in claim 1 wherein extrapolating the helical inner edge upwardly one would create a helix which completes one full rotation over a vertical distance selected to lie between 3.5 to 6 meters.

5. The wind turbine blade claimed in claim 1 wherein extrapolating the helical inner edge 106 upwardly one would create a helix which completes one full rotation over a vertical distance over a distance of 5 meters.

6. The wind turbine blade claimed in claim 1 wherein the radius R of the top edge is selected to be between 10 centimeters and 40 centimeters.

7. The wind turbine blade claimed in claim 1 wherein the radius R of the top edge is selected to be 20 centimeters.

8. The wind turbine blade claimed in claim 5 wherein the radius R of the top edge is selected to be 20 centimeters.

9. A wind turbine including at least one turbine blade as claimed in claim 1, mounted to a vertical rotor shaft with at least one transversely oriented strut such that outer edge defines the outer diameter of the turbine and the blade revolves about the rotor shaft.

10. The wind turbine claimed in claim 9, wherein the rotor shaft is connected to a large diameter generator.

* * * * *